United States Patent
Zhang et al.

(10) Patent No.: US 8,224,325 B2
(45) Date of Patent: Jul. 17, 2012

(54) RESOURCE CONTROL METHOD, RELEVANT DEVICE, AND SYSTEM

(75) Inventors: Yanping Zhang, Shanghai (CN); Wenfu Wu, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 13/235,062

(22) Filed: Sep. 16, 2011

(65) Prior Publication Data

US 2012/0064895 A1 Mar. 15, 2012

Related U.S. Application Data

(63) Continuation of application No. PCT/CN2010/071057, filed on Mar. 16, 2010.

(30) Foreign Application Priority Data

Mar. 16, 2009 (CN) .......................... 2009 1 0118794

(51) Int. Cl.
H04W 4/00 (2009.01)
(52) U.S. Cl. .................. 455/435.3; 455/435.2; 455/436; 455/450; 455/453; 455/455; 370/329; 370/338; 370/348
(58) Field of Classification Search ............... 455/435.2, 455/436–439, 450, 453, 455; 370/329, 338, 370/348
See application file for complete search history.

(56) References Cited

U.S. PATENT DOCUMENTS

| 7,924,716 | B2 * | 4/2011 | Corliano et al. | 370/230 |
| 2006/0126504 | A1 * | 6/2006 | Meier et al. | 370/229 |
| 2007/0249339 | A1 * | 10/2007 | Tamura et al. | 455/433 |
| 2008/0181178 | A1 | 7/2008 | Shaneen | |
| 2009/0109986 | A1 * | 4/2009 | Zhao et al. | 370/401 |

FOREIGN PATENT DOCUMENTS

| CN | 1885996 A | 12/2006 |
| CN | 101052188 A | 10/2007 |
| CN | 101064936 | * 10/2007 |
| CN | 101064938 A | 10/2007 |
| CN | 101330720 A | 12/2008 |
| CN | 101668312 A | 3/2010 |
| WO | WO 2007/026268 A1 | 3/2007 |
| WO | WO 2008080422 A1 | 7/2008 |
| WO | WO 2011/041966 A1 | 4/2011 |

OTHER PUBLICATIONS

Office Action issued in corresponding Chinese Patent Application No. 200910118794.0, mailed Sep. 21, 2011.

(Continued)

*Primary Examiner* — Nick Corsaro
*Assistant Examiner* — Quan Hua
(74) *Attorney, Agent, or Firm* — Brinks Hofer Gilson & Lione

(57) ABSTRACT

A resource control method, a relevant device, and a relevant system are disclosed in embodiments of the present invention. The resource control method includes: determining another network suitable for a User Equipment (UE) according to resource information requested by the UE when the UE accesses multiple networks using a same Access Point Name (APN) and sends a resource request in a current network, and notifying information about the determined another network to the UE. By using the technical solutions provided in the embodiment of the present invention, a network-side device can properly control resources.

13 Claims, 8 Drawing Sheets

OTHER PUBLICATIONS

Written Opinion of the International Searching Authority issued in corresponding PCT Patent Application No. PCT/CN2010/071057, mailed May 27, 2010.

International Search Report issued in corresponding PCT Patent Application No. PCT/CN2010/071057, mailed May 27, 2010.

Extended European Search Report issued in corresponding European Patent Application No. 10753112.1, mailed Mar. 29, 2012.

LTE, "$3^{rd}$ Generation Partnership Project; Technical Specification Group Services and System Aspects; Multi Access PDN Connectivity and IP Flow Mobility" (Release 9) 3GPP TR 23.861, V1.0.0. Mar. 2009.

\* cited by examiner

RESOURCE CONTROL METHOD, RELEVANT DEVICE, AND SYSTEM

CROSS-REFERENCE TO RELATED APPLICATIONS

This application is a continuation of International Application No. PCT/CN2010/071057, filed on Mar. 16, 2010, which claims priority to Chinese Patent Application No. 200910118794.0, filed on Mar. 16, 2009, both of which are hereby incorporated by reference in their entireties.

FIELD OF THE INVENTION

The present invention relates to the field of communications technologies, and in particular, to a resource control method, a relevant device, and a relevant system.

BACKGROUND OF THE INVENTION

Currently, a User Equipment (UE) may access both a 3rd Generation Partnership Project (3GPP) network and a non-3GPP network. However, if a UE that supports a multi-access function simultaneously requests services in multiple networks such as a 3GPP network and a non-3GPP network, a network-side device is unable to implement resource control on service stream distribution of the UE that accesses the network in a multi-access mode.

SUMMARY OF THE INVENTION

Embodiments of the present invention provide a resource control method, a relevant device, and a relevant system so that when a UE accesses multiple networks, a network-side device can implement resource control on service stream distribution of the UE.

Embodiments of the present invention provide the following technical solutions:

A resource control method includes:

determining another network suitable for a UE to use according to resource information requested by the UE when the UE accesses multiple networks using a same Access Point Name (APN) and sends a resource request in a current network, and notifying information about the determined another network to the UE.

A network device includes:

a determining unit, configured to determine another network suitable for a UE to use when the UE accesses multiple networks by using a same APN and sends a resource request in a current network; and a sending unit, configured to send a notification message to the UE, where the notification message includes information about the determined another network.

A network system includes:

a Policy and Charging Rule Function (PCRF), configured to: receive resource information that is requested by a UE and sent by a Packet Data Network (PDN) Gateway (GW); determine another network suitable for the UE to use according to the resource information requested by the UE; and send information about the determined another network to the PDN GW; and the PDN GW, configured to send the resource information requested by the UE to the PCRF, and send the information about another network determined by the PCRF to the UE.

In the embodiments of the present invention, when the UE accesses multiple networks by using the same APN and sends a resource request in one of the networks, the network-side device determines another network suitable for the UE to use, and notifies information about the determined another network to the UE. Therefore, the UE may carry out services in the network suitable for the UE to use, user experience is improved, and the network-side device can implement resource control on the service stream distribution of the UE.

DETAILED DESCRIPTION OF THE EMBODIMENTS

Figure 1:
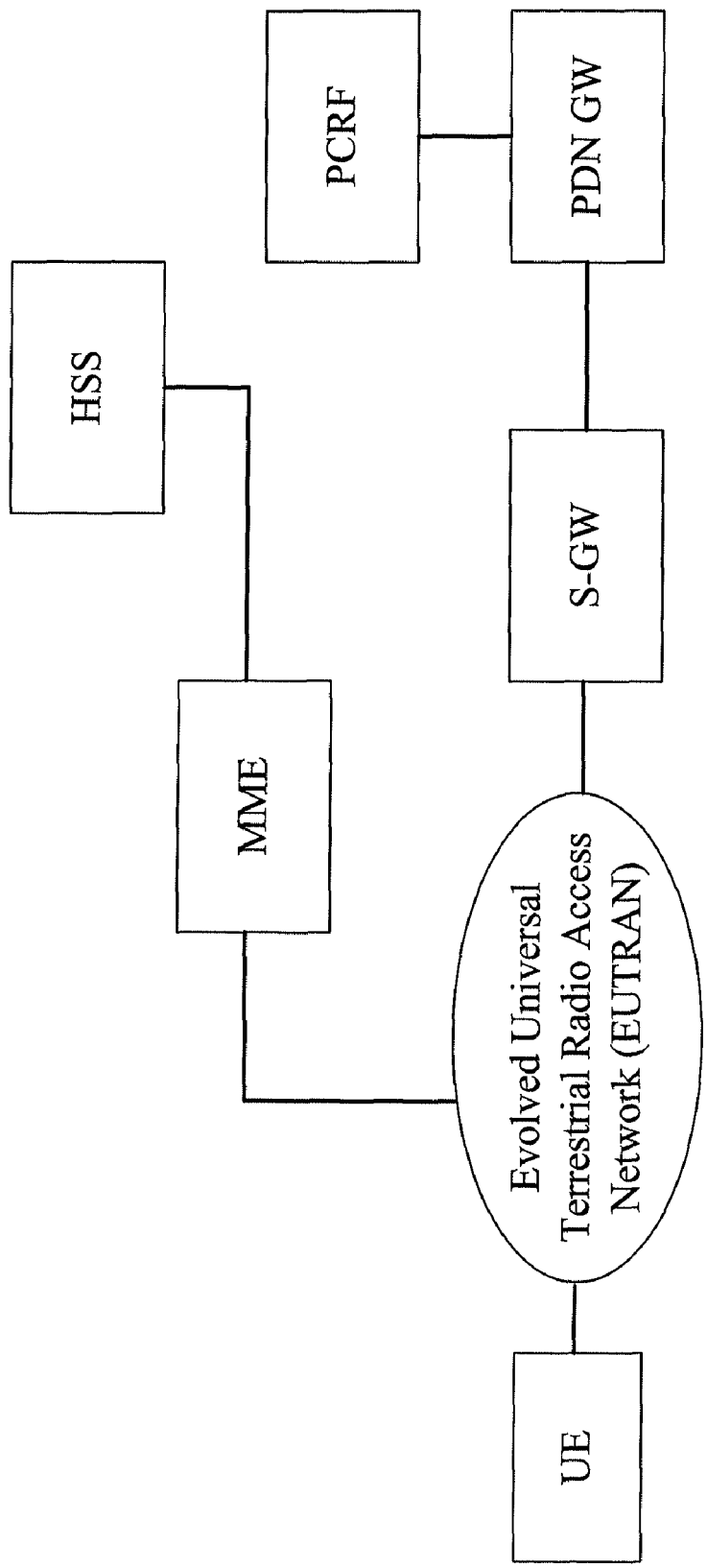
FIG. 1 is a block diagram of a Core Network (CN) of an evolved radio network.

Architecture in the embodiments of the present invention is as shown in FIG. 1. A CN of an evolved radio network mainly includes the following three logical functional entities: a Mobility Management Entity (MME), a Serving Gateway (S-GW), and a PDN GW. The MME is responsible for functions including processing and encryption of Non Access Stratum (NAS) signaling, roaming and tracking, allocation of a temporary user identity, and security. The MME is equivalent to a control plane of an internal Serving GPRS Support Node (SGSN, where GPRS is short for General Packet Radio Service) of a current Universal Mobile Telecommunications System (UMTS). The S-GW is responsible for local mobility anchor, internal mobility anchor of a 3GPP system; and lawful interception of relevant information; and the PDN GW is responsible for functions including policy enforcement, charging, and lawful interception. A Home Subscriber Server (HSS) is configured to store subscription information of a UE.

Embodiment 1

A first embodiment of the present invention provides a resource control method. The method includes:

When a UE accesses multiple networks by using a same APN and sends a resource request in a current network, a network-side device determines another network suitable for the UE to use; if the network-side device refuses to accept the resource request sent by the UE in the current network, the network-side device notifies the UE of information about another network recommended or specified by the network-side device for the UE to use; if the network-side device can accept the resource request sent by the UE in the current network, the network-side device notifies the UE of information about another network recommended by the network-side device for the UE to use.

Specifically, the mode for notifying the UE of information about another network recommended or specified by the network-side device for the UE to use may be: sending a message that carries an identifier (ID) of another network recommended or specified by the network-side device for the UE to use, or sending a message that carries IDs of networks that are not recommended or not specified by the network-side device for the UE to use. In the latter circumstance, after receiving the IDs of the networks that are not recommended or not specified by the network-side device for the UE to use, the UE knows the network recommended or specified by the network-side device for the UE to use. The network ID may be an access type of the network. In this embodiment and subsequent embodiments of the present invention, the access type of the network refers to a Radio Access Technique (RAT) type, or an IP-Connectivity Access Network (IP CAN, where IP is short for Internet Protocol) type, or a combination of thereof.

An entity that executes this method may be a PCRF or a PDN GW. When the entity that executes this method is a PCRF, the PCRF sends to a gateway device an ID of a network recommended or specified by the PCRF for the UE to use, and the gateway device notifies the ID of the network recommended or specified by the PCRF for the UE to use to the UE. The gateway device may be a PDN GW or a Bearer Binding and Event Reporting Function (BBERF).

In the first embodiment of the present invention, when the UE accesses multiple networks by using the same APN and sends a resource request in the current network, the network-side device determines another network suitable for the UE to use; if the network-side device refuses to accept the resource request sent by the UE in the current network, the network-side device notifies the UE of another network recommended or specified by the network-side device for the UE to use so as to properly control network resources; if the network-side device can accept the resource request sent by the UE in the current network, the network-side device notifies the UE of another network recommended by the network-side device for the UE to use. In this way, the UE may choose to set up resources in the network recommended by the network-side device, and switch a service stream to the network recommended by the network-side device, and therefore user experience is improved.

Embodiment 2

Figure 2:
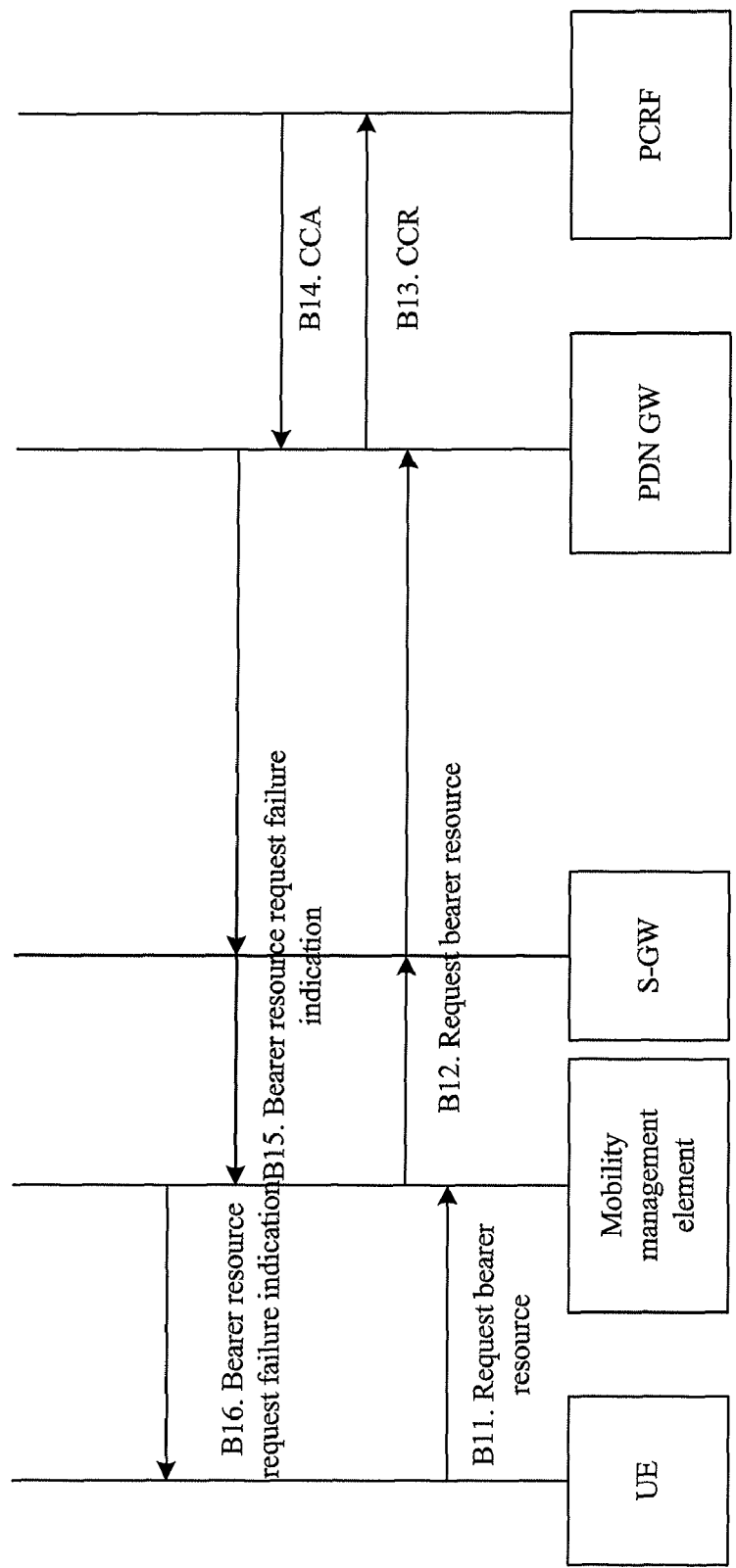
FIG. 2 is a signaling flowchart of a resource control method according to a second embodiment of the present invention.

As shown in FIG. 2, a second embodiment of the present invention provides a resource control method. In this method, when a network-side device refuses to accept a resource request sent by the UE in a current network, the network-side device recommends another network for the UE to use. The method includes the following steps:

B11. When a UE accesses multiple networks by using a same APN, the UE sends a Request Bearer Resource message to a mobility management element in a current network. This message includes a Quality of Service (QoS) parameter requested by the UE, and data stream information corresponding to requested resources.

B12. The mobility management element sends the Request Bearer Resource message to a PDN GW through an S-GW. This message includes the QoS parameter requested by the UE, and the data stream information corresponding to the requested resources.

B13. If a dynamic Policy and Charging Control (PCC) rule is configured, the PDN GW sends a Credit Control Request (CCR) message to a PCRF. This message includes the QoS parameter requested by the UE and the data stream information corresponding to the requested resources, and may further include a current access type of the UE. In this embodiment and subsequent embodiments of the present invention, the access type refers to a RAT type, or an IP CAN type, or a combination thereof.

If a static PCC rule is configured, in this embodiment and subsequent embodiments, the PDN GW performs a function of the PCRF. The PDN GW determines a PCC rule according to the data stream information, which does not affect implementation of the present invention.

B14. The PCRF knows a service to be performed by the UE according to the data stream information corresponding to the resources requested by the UE and determines whether to accept the resource request sent by the UE in the network of the access type according to a property of the network and at least one of the following: subscription information of the UE, the QoS parameter requested by the UE, and the data stream information. Meanwhile, the PCRF may also determine, according to an operator's policy, whether to accept the resource request sent by the UE in the network of the access type. If the PCRF refuses to accept the resource request sent by the UE in the network of the access type, the PCRF determines another network suitable for the UE to use according to a property of another network and at least one of the following: the subscription information of the UE, the QoS parameter requested by the UE, and the data stream information. Meanwhile, the PCRF may also determine another network suitable for the UE to use according to the operator's policy. A network property related to the PCRF may be stored on the PCRF, or the PCRF obtains a network property related to the PCRF. The PCRF sends a Request Reject message to the PDN GW as a Credit Control Answer (CCA). The Request Reject message may also carry access type indication information "Preference Type". The indication information indicates a network recommended by the network-side device for the UE to use. The network recommended by the network-side device for the UE to use is a network determined by the PCRF as suitable for the UE to use; the network recommended by the network-side device for the UE to use may be a network that currently meets a resource requirement of the UE or a network suitable for the service to be performed by the UE. Specifically, the indication information may be an access type of the network recommended by the network-side device for the UE to use; that is, the network-side device recommends a network in which the UE should request resources corresponding to a data stream. The indication information may also be access types of networks that are recommended by the network-side device as unavailable to the UE. Subsequently, after receiving the access types of the networks that are recommended by the network-side device as unavailable to the UE, the UE knows the network recommended by the network-side device for the UE to use. In this embodiment and subsequent embodiments, "Preference Type" may be an enumerated value; "1" represents a Wireless Local Area Network (WLAN); "2" represents a World Interoperability for Microwave Access (WiMAX) network. The WLAN or the WiMAX may also be identified by a string, which does not affect implementation of the present invention. It should be noted that the "Preference Type" may include access types of one or multiple networks.

B15. The PDN GW receives the CCA from the PCRF, and sends a Bearer Resource Request Failure Indication message to the mobility management element through the S-GW. This message carries recommended access type indication information "Preference Type".

B16. The mobility management element sends the Bearer Resource Request Failure Indication message to the UE. This message carries the recommended access type indication information "Preference Type".

Subsequently, after receiving the Bearer Resource Request Failure Indication message, the UE knows the network recommended by the network-side device for the UE to use according to the "Preference Type" included in the Bearer Resource Request Failure Indication message, and then the UE initiates a resource setup procedure in the network recommended by the network-side device, for example, in a non-3GPP network.

In the second embodiment of the present invention, when the UE requests resources in a network, if determining that the resource request sent by the UE in this network is unacceptable, the network-side device rejects the resource request sent by the UE, and notifies the UE of a network recommended by the network-side device so that the UE may initiate a resource setup procedure in the recommended network. In this way, the UE may be prevented from persistently attempt to send a resource request in the current network; meanwhile, the network-side device also provides a network selection policy for the UE to use, which prevents the UE from blindly attempt to request resources in another network.

Embodiment 3

Figure 3:
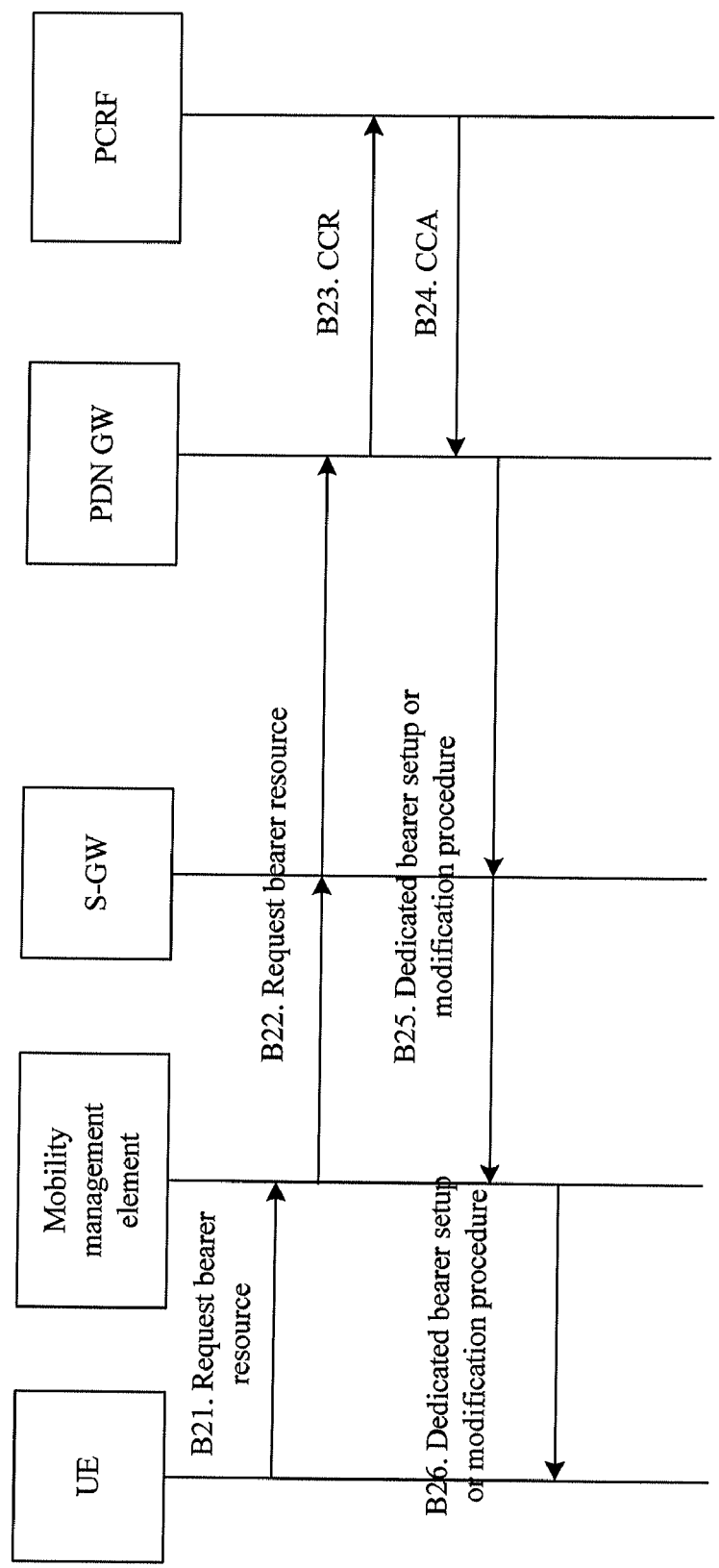
FIG. 3 is a signaling flowchart of a resource control method according to a third embodiment of the present invention.

As shown in FIG. 3, a third embodiment of the present invention provides a resource control method. In this method, a network-side device can accept a resource request sent by the UE in a current network, determine another network suitable for the UE to use, and notify information about the determined another network to the UE. The method includes the following steps:

Steps B21-B23 are the same as steps B11-B13 in the first embodiment.

B24. The PCRF knows a service to be performed by the UE according to the data stream information corresponding to the resources requested by the UE, and determines whether to accept the resource request sent by the UE in the network of the access type according to subscription information of the UE, the QoS parameter requested by the UE, an operator's policy, the data stream information, or resource information of the current network. If the PCRF accepts the resource request sent by the UE in the network of the access type, the PCRF generates a PCC rule according to the resource request sent by the UE, and determines another network more suitable for the UE to use according to the subscription information of the UE, the QoS parameter requested by the UE, the operator's policy, the data stream information, or a property of another network. The PCRF sends a Request Accept message to the PDN GW as a CCA. The Request Accept message carries the PCC rule and the current access type of the UE. The CCA message may carry access type indication information "Preference Type". The indication information indicates a network recommended by the network-side device for the UE to use. The network recommended by the network-side device for the UE to use is another network determined by the PCRF as more suitable for the UE to use; the network recommended by the network-side device for the UE to use may be a network more suitable for the service to be performed by the UE. Specifically, the indication information may be an access type of the network recommended by the network-side device for the UE to use; that is, the network-side device recommends a network in which the UE should request resources corresponding to a data stream. The indication information may also be access types of networks that are recommended by the network-side device as unavailable to the UE. Subsequently, after receiving the access types of the networks that are recommended by the network-side device as unavailable to the UE, the UE knows the network recommended by the network-side device for the UE to use.

B25. The PDN GW initiates a dedicated bearer setup or modification procedure to the mobility management element through the S-GW according to the PCC rule. In this procedure, access type indication information "Preference Type" is sent to the mobility management element.

B26. The mobility management element initiates a dedicated bearer setup or modification procedure to the UE. In this procedure, access type indication information "Preference Type" is sent to the UE.

Subsequently, the UE may initiate a resource setup procedure or a switching procedure in the recommended network.

In the third embodiment of the present invention, when the UE requests resources in a network, if determining that the resource request sent by the UE in this network is acceptable, the network-side device notifies the UE of a network recommended by the network-side device. After receiving the notification, the UE may initiate a resource setup procedure or a switching procedure in the network. In this way, the UE performs a service in the network recommended by the network-side device (for example, a network that currently meets a resource requirement of the UE, or a network more suitable for the service to be performed by the UE), and therefore user experience is improved.

Embodiment 4

Figure 4:
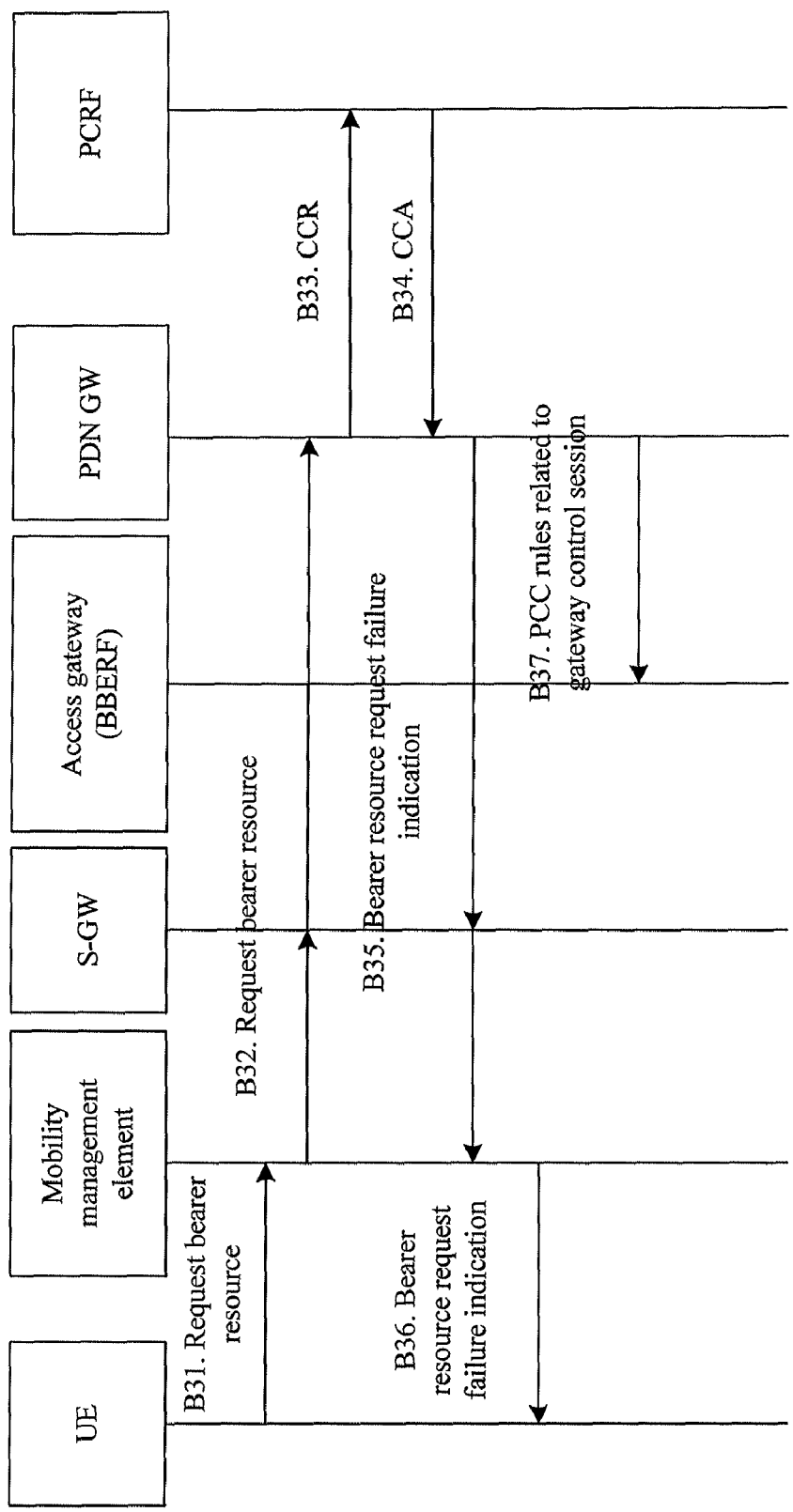
FIG. 4 is a signaling flowchart of a resource control method according to a fourth embodiment of the present invention.

As shown in FIG. 4, a fourth embodiment of the present invention provides a resource control method. In this method, a network-side device refuses to accept the resource request sent by the UE in the current network, determines another network suitable for the UE to use, sets up resources for the UE in the network suitable for the UE to use, and notifies the UE that the resources have been set up for the UE in a suitable network. The method includes the following steps:

Steps B31-B33 are the same as steps B11-B13 in the first embodiment.

B34. The PCRF knows a service to be performed by the UE according to the data stream information corresponding to the resources requested by the UE and determines whether to accept the resource request sent by the UE in the network of the access type according to subscription information of the UE, the QoS parameter requested by the UE, an operator's policy, the data stream information, or resource information of the current network. If the PCRF refuses to accept the resource request sent by the UE in the network of the access type, the PCRF determines another network suitable for the UE to use according to the subscription information of the UE, the QoS parameter requested by the UE, the operator's policy, the data stream information, or a property of another network. The PCRF sets up resources for the UE in the network suitable for the UE to use, and generates a PCC rule according to the resource request sent by the UE. The PCRF sends a Request Reject message to the PDN GW as a CCA. The Request Reject message carries the PCC rule, and carries "Preference Type" as indication information to indicate the network specified by the network-side device for the UE to use. The network specified by the network-side device for the UE to use is a network determined by the PCRF as suitable for the UE to use, and may be a network that currently meets a resource requirement of the UE or a network suitable for the service to be performed by the UE. Specifically, the indication information may be an access type of the network specified by the network-side device for the UE to use; or, the indication information may be access types of networks specified by the network-side device as unavailable to the UE. Subsequently, after receiving the access types of the networks specified by the network-side device as unavailable to the UE, the UE knows the network specified by the network-side device for the UE to use. The "Preference Type" indicates a network in which the PDN GW enforces the PCC rule. Alternatively, the CCA message carries the PCC rule, the PCC rule carries recommended access type indication information "Preference Type", and the "Preference Type" indicates the network in which the PDN GW enforces the PCC rule. The PCC rule delivered by the PCRF may be intended for multiple networks, which does not affect implementation of the present invention. The PCC rule in this step is related to an IP CAN session.

B35. The PDN GW sends a Bearer Resource Request Failure Indication message to the mobility management element through the S-GW. The message may carry the recommended access type indication information "Preference Type", and may further carry "Resource Allocated" to notify the UE that resources requested by the UE have been set up in another network. In this case, the PDN GW notifies the access type of the network that sets up the resources for the UE while notifying that the resources requested by the UE have been set up in another network.

B36. The mobility management element sends the Bearer Resource Request Failure Indication message to the UE. This Bearer Resource Request Failure Indication message carries the access type indication information "Preference Type" and "Resource Allocated".

Subsequently, the UE may perform a service in the network specified by the network-side device.

B37. If a gateway control session exists between a BBERF (the BBERF may be an access gateway in a non-3GPP network) and the PCRF in the network determined by the PCRF as the network that sets up the resources for the UE, the PCRF generates a PCC rule related to the gateway control session according to the resource request sent by the UE, and delivers the PCC rule to the BBERF. The BBERF sets up the resources for the UE after receiving the PCC rule.

It should be noted that in step B37, the BBERF sets up access resources between the BBERF and the UE; if no bearer resource exists between the BBERF and the PDN GW, the PDN GW sets up bearer resources between the PDN GW and the BBERF according to the PCC rule generated by the PCRF; if the bearer resources between the BBERF and the PDN GW need to be updated, the PDN GW updates the bearer resources between the PDN GW and the BBERF according to the PCC rule generated by the PCRF.

In the fourth embodiment of the present invention, when the UE requests resources in a network, if determining that the resource request sent by the UE in this network is unacceptable, the network-side device rejects the resource request sent by the UE in this network, specifies a network for the UE to use, and sets up resources in the specified network for the UE. In this way, a better service is provided for the UE in the specified network, and user experience is improved.

Embodiment 5

Figure 5:
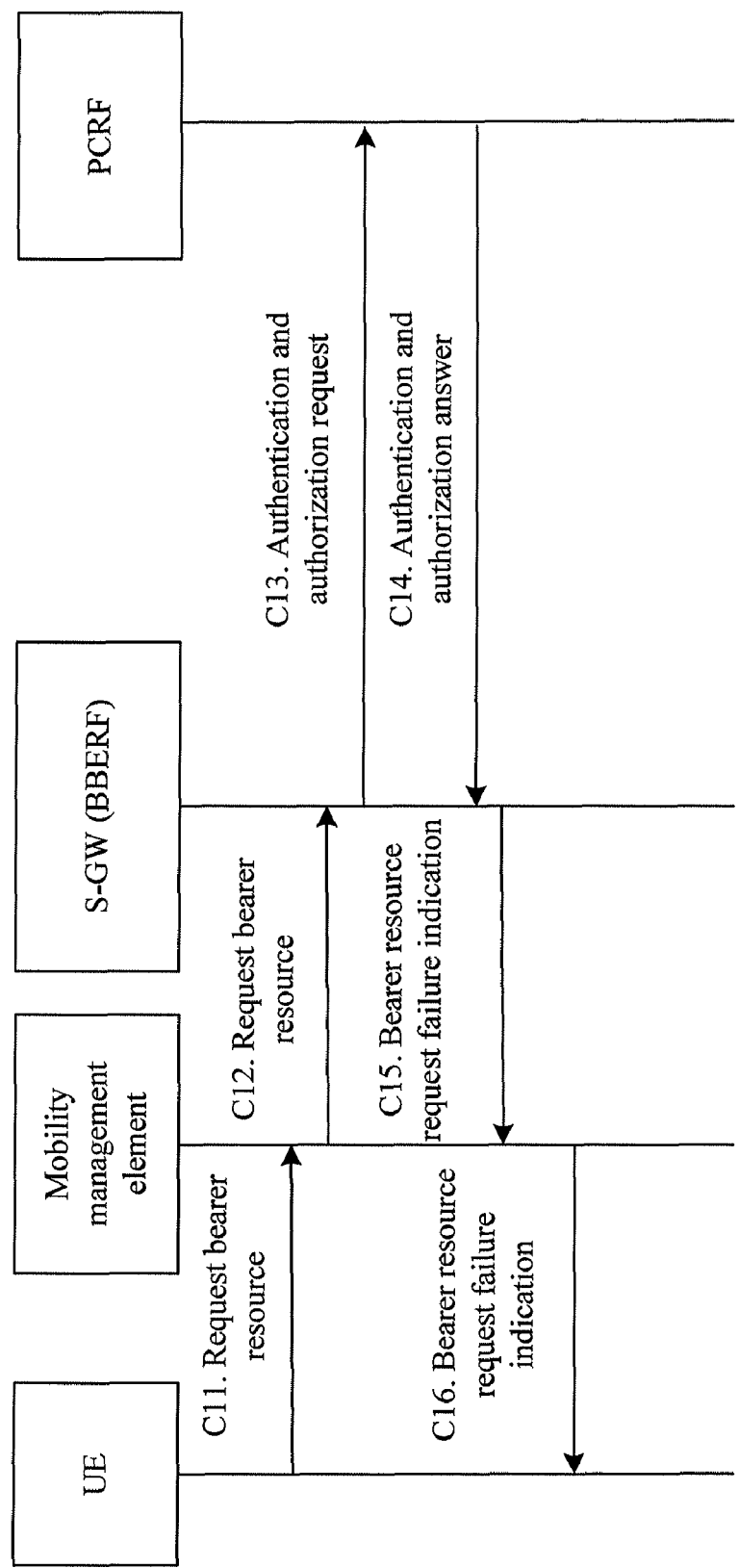
FIG. 5 is a signaling flowchart of a resource control method according to a fifth embodiment of the present invention.

As shown in FIG. 5, a fifth embodiment of the present invention provides a resource control method. In this method, an S-GW is a BBERF, and a Mobile Internet Protocol (MIP) is applied between the S-GW and a PDN GW. When a network-side device refuses to accept a resource request sent by the UE in a current network, the network-side device recommends another network available to the UE. The method includes the following steps:

Steps C11-C12 are the same as steps B11-B12.

C13. The S-GW (BBERF) sends an Authentication and Authorization Request message to the PCRF, requesting a PCC rule related to a gateway control session.

C14. The PCRF knows a service to be performed by the UE according to the data stream information corresponding to the resources requested by the UE, and determines whether to accept the resource request sent by the UE in the network of the access type according to subscription information of the UE, the QoS parameter requested by the UE, an operator's policy, the data stream information, or resource information of the current network. If the PCRF refuses to accept the resource request sent by the UE in the network of the access type, the PCRF determines another network suitable for the UE to use according to the subscription information of the UE, the QoS parameter requested by the UE, the operator's policy, the data stream information, or a property of another network. The PCRF sends a Request Reject message to the S-GW (BBERF) as an Authentication and Authorization Answer. The Request Reject message may also carry access type indication information "Preference Type". The indication information indicates a network recommended by the network-side device for the UE to use. The network recommended by the network-side device for the UE to use is a network determined by the PCRF as suitable for the UE to use; the network recommended by the network-side device for the UE to use may be a network that currently meets a resource requirement of the UE or a network suitable for the service to be performed by the UE. Specifically, the indication information may be an access type of the network recommended by the network-side device for the UE to use; that is, the network-side device recommends a network in which the UE should request resources corresponding to a data stream. The indication information may also be access types of networks that are recommended by the network-side device as unavailable to the UE. Subsequently, after receiving the access types of the networks that not recommended by the network-side device as unavailable to the UE, the UE knows the network recommended by the network-side device for the UE to use. It should be noted that the "Preference Type" may include access types of one or multiple networks.

C15. The S-GW (BBERF) sends a Bearer Resource Request Failure Indication message to the mobility management element. This message carries recommended access type indication information "Preference Type".

C16. The mobility management element sends the Bearer Resource Request Failure Indication message to the UE. This message carries the recommended access type indication information "Preference Type".

Subsequently, the UE initiates a resource setup procedure in the recommended network (such as a non-3GPP network).

In the fifth embodiment of the present invention, when the UE requests resources in a network, after the PCRF receives an authentication and authorization request from the S-GW (BBERF), if determining that the resource request sent by the UE in this network is unacceptable, the PCRF rejects the resource request sent by the UE, and notifies the UE of a network recommended by the network-side device for the UE to use so that the UE may initiate a resource setup procedure in the recommended network. In this way, the UE may be prevented from persistently attempt to send a resource request in the current network; meanwhile, the network-side device also provides a network selection policy for the UE, which prevents the UE blindly attempt to request resources in another network.

Embodiment 6

Figure 6:
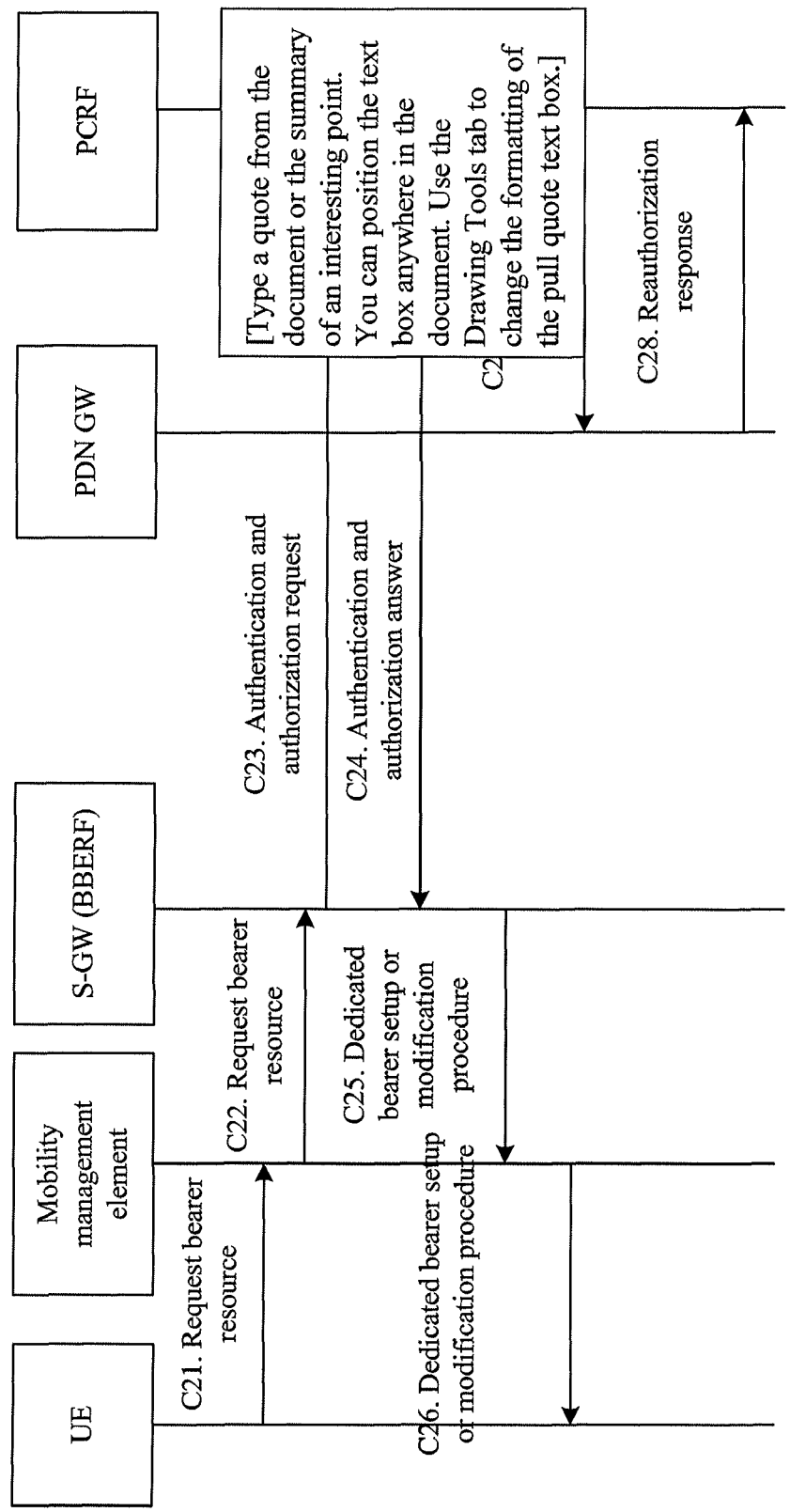
FIG. 6 is a signaling flowchart of a resource control method according to a sixth embodiment of the present invention.

As shown in FIG. 6, a sixth embodiment of the present invention provides a resource control method. In this method, an S-GW is a BBERF, an MIP protocol is applied between the S-GW and a PDN GW, and a network-side device can accept a resource request sent by the UE in the current network, determine another network suitable for the UE to use, and notify information about the determined another network to the UE. The method includes the following steps:

Steps C21-C22 are the same as steps C11-C12.

C23. The S-GW (BBERF) sends an Authentication and Authorization Request message to the PCRF, requesting a PCC rule related to a gateway control session.

C24. The PCRF knows a service to be performed by the UE according to the data stream information corresponding to the resources requested by the UE, and determines whether to accept the resource request sent by the UE in the network of the access type according to subscription information of the UE, the QoS parameter requested by the UE, an operator's policy, the data stream information, or resource information of the current network. If the PCRF accepts the resource request sent by the UE in the network of the access type, the PCRF generates the PCC rule related to the gateway control session according to the resource request sent by the UE, and determines another network more suitable for the UE to use according to the subscription information of the UE, the QoS parameter requested by the UE, the operator's policy, the data stream information, or a property of another network. The PCRF sends a Request Accept message to the S-GW as an Authentication and Authorization Answer. The Request Accept message carries the PCC rule related to the gateway control session and the current access type of the UE. The Authentication and Authorization Answer message may also carry access type indication information "Preference Type". The indication information indicates a network recommended by the network-side device for the UE to use. The network recommended by the network-side device for the UE to use is another network determined by the PCRF as more suitable for the UE to use; the network recommended by the network-side device for the UE to use may be a network more suitable for the service to be performed by the UE. Specifically, the indication information may be an access type of the network recommended by the network-side device for the UE to use; that is, the network-side device recommends a network in which the UE should request resources corresponding to a data stream. The indication information may also be access types of networks that not recommended by the network-side device as unavailable to the UE. Subsequently, after receiving the access types of the networks that are recommended by the network-side device as unavailable to the UE, the UE knows the network recommended by the network-side device for the UE to use.

C25. The S-GW (BBERF) initiates a dedicated bearer setup or modification procedure to the mobility management element according to the PCC rule related to the gateway control session. In this procedure, access type indication information "Preference Type" is sent to the mobility management element.

C26. The mobility management element initiates the dedicated bearer setup or modification procedure to the UE. In this procedure, access type indication information "Preference Type" is sent to the UE.

C27. The PCRF generates a PCC rule related to an IP CAN session according to a bearer resource request sent by the UE, and sends a Reauthorization Request message to the PDN GW. This message carries the PCC rule related to the IP CAN session.

C28. The PDN GW sets up resources for the UE according to the PCC rule related to the IP CAN session, and sends a reauthorization response to the PCRF.

Subsequently, the UE may initiate a resource setup procedure or a switching procedure in the recommended network.

In the sixth embodiment of the present invention, when the UE requests resources in a network, after the PCRF receives an authentication and authorization request sent by the S-GW (BBERF), if determining that the resource request sent by the UE in this network is acceptable, the PCRF notifies the UE of a network recommended by the network-side device. After receiving the notification, the UE may initiate a resource setup procedure or a switching procedure in the network. In this way, the UE performs a service in the network recommended by the network-side device (for example, a network that currently meets a resource requirement of the UE, or a network more suitable for the service to be performed by the UE), and therefore user experience is improved.

Embodiment 7

Figure 7:
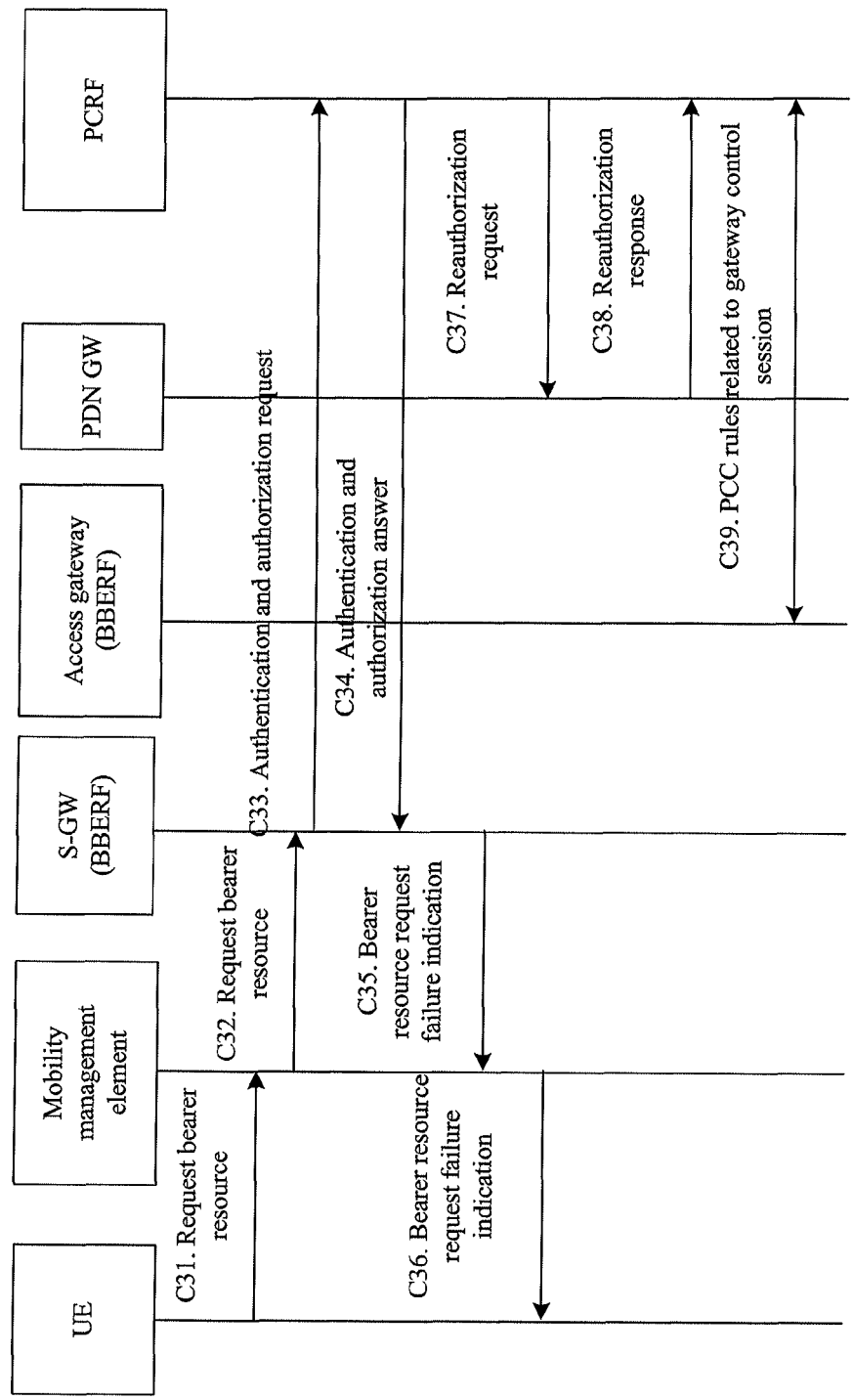
FIG. 7 is a signaling flowchart of a resource control method according to a seventh embodiment of the present invention.

As shown in FIG. 7, a seventh embodiment of the present invention provides a resource control method. In this method, an S-GW is a BBERF, an MIP protocol is applied between the S-GW and a PDN GW, and a network-side device refuses to accept the resource request sent by the UE in the current network, determines another network suitable for the UE to use, sets up resources for the UE in the network suitable for the UE to use, and notifies the UE that the resources have been set up for the UE in a suitable network. The method includes the following steps:

Steps C31-C32 are the same as steps C11-C12.

C33. The S-GW (BBERF) sends an Authentication and Authorization Request message to the PCRF, requesting a PCC rule related to a gateway control session.

C34. The PCRF knows a service to be performed by the UE according to the data stream information corresponding to the resource requested by the UE, and determines whether to accept the resource request sent by the UE in the network of the access type according to subscription information of the UE, the QoS parameter requested by the UE, an operator's policy, the data stream information, or resource information of the current network. If the PCRF refuses to accept the resource request sent by the UE in the network of the access type, the PCRF determines another network suitable for the UE to use according to the subscription information of the UE, the QoS parameter requested by the UE, the operator's policy, the data stream information, or a property of another network. The PCRF sets up resources for the UE in the network suitable for the UE to use, and sends a Request Reject message to the S-GW (BBERF) as an Authentication and Authorization Answer. The Request Reject message may carry access type indication information "Preference Type". The indication information indicates the network specified by the network-side device for the UE to use. The network specified by the network-side device for the UE to use is a network determined by the PCRF as suitable for the UE to use, and may be a network that currently meets a resource requirement of the UE or a network suitable for the service to be performed by the UE. Specifically, the indication information may be an access type of the network specified by the network-side device for the UE to use; or, the indication information may be access types of networks specified by the network-side device as unavailable to the UE. Subsequently, after receiving the access types of the networks specified by the network-side device as unavailable to the UE, the UE knows the network specified by the network-side device for the UE to use.

C35. The S-GW (BBERF) sends a Bearer Resource Request Failure Indication message to the mobility management element. The message may carry the recommended access type indication information "Preference Type", and may further carry "Resource Allocated" to notify the UE that the resources requested by the UE have been set up in another network. In this case, the PDN GW notifies the access type of the network that sets up the resources for the UE while notifying that the resources requested by the UE have been set up in another network.

C36. The mobility management element sends the Bearer Resource Request Failure Indication message to the UE.

C37. The PCRF generates a PCC rule related to an IP CAN session according to a bearer resource request of the UE, and sends a Reauthorization Request message to the PDN GW. This message carries the PCC rule related to the IP CAN session.

C38. The PDN GW sets up resources for the UE according to the PCC rule related to the IP CAN session, and sends a reauthorization response to the PCRF.

C39. If a gateway control session exists between a BBERF (the BBERF may be an access gateway in a non-3GPP network) and the PCRF in the network determined by the PCRF as the network which sets up the resources for the UE, the PCRF generates the PCC rule related to the gateway control session according to the resource request sent by the UE, and delivers the PCC rule to the BBERF. The BBERF sets up the resources for the UE after receiving the PCC rule.

Step C39 may be performed after step C34 where the PCRF determines another network suitable for the UE to use.

In the seventh embodiment of the present invention, when the UE requests resources in a network, after the PCRF receives an authentication and authorization request from the S-GW (BBERF), if determining that the resource request sent by the UE in this network is unacceptable, the PCRF rejects the resource request sent by the UE in this network, specifies a network available to the UE, and sets up resources in the specified network for the UE. In this way, a better service is provided for the UE in the specified network, and user experience is improved.

In the case that the UE simultaneously accesses a 3GPP network and a non-3GPP network, the UE may request resources from both the 3GPP network and the non-3GPP network according to embodiments 4-7; the network-side device controls resources in the way described in embodiments 4-7; and an access gateway (BBERF) in the non-3GPP network implements a function of an S-GW (BBERF) in embodiments 4-7, which are not further described here.

Embodiment 8

Figure 8:
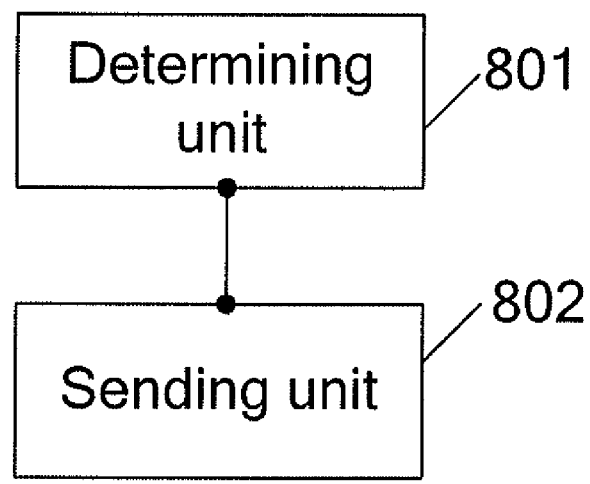
FIG. 8 is a block diagram of a network device according to an eighth embodiment of the present invention.

As shown in FIG. 8, an eighth embodiment of the present invention provides a network device. The network device includes:

a determining unit 801, configured to determine another network suitable for a UE to use when the UE accesses multiple networks by using a same APN and sends a resource request in a current network; and a sending unit 802, configured to send a notification message to the UE, where the notification message carries information about the determined another network.

The network device is a PCRF. When the network-side device refuses to accept the resource request sent by the UE in the current network, the network suitable for the UE to use is a network recommended or specified by the PCRF for the UE to use; the sending unit 802 is configured to send a notification message, where the notification message carries an ID of the network recommended or specified by the PCRF for the UE to use. The notification message may be a CCA message, or an Authentication and Authorization Answer message. The PCRF further includes a first processing unit, which is configured to generate a PCC rule corresponding to the specified network, and send the PCC rule to a gateway device so that the gateway device can set up resources for the UE in the specified network according to the PCC rule, where the gateway device may be a PDN GW or a BBERF in the specified network.

The network device is a PDN GW. When the network-side device refuses to accept the resource request sent by the UE in the current network, the network suitable for the UE to use is a network recommended or specified by the PDN GW for the UE to use; the sending unit 802 is configured to send a Bearer Resource Request Failure Indication message, where the Bearer Resource Request Failure Indication message carries an ID of the network recommended or specified by the PDN GW for the UE to use. The PDN GW further includes a second processing unit, which is configured to generate a PCC rule corresponding to the specified network, and set up resources for the UE in the specified network according to the PCC rule, where the Bearer Resource Request Failure Indication message further includes indication information indicating that the resources have been set up in the specified network.

The network device is a PCRF. When the network-side device can accept the resource request sent by the UE in the current network, the network suitable for the UE to use is a network recommended by the PCRF for the UE to use; the sending unit 802 is configured to send a notification message, where the notification message carries an ID of the network recommended by the PCRF for the UE to use. The notification message may be a CCA message, or an Authentication and Authorization Answer message.

The network device is a PDN GW. When the network-side device can accept the resource request sent by the UE in the current network, the network suitable for the UE to use is a network recommended by the PDN GW for the UE to use; and the sending unit 802 is configured to send a resource setup or modification request in the current network, where the resource setup or modification request carries an ID of the network recommended by the PDN GW for the UE to use.

The network device provided in the eighth embodiment of the present invention determines another network suitable for the UE to use when the UE accesses multiple networks by using the same APN and sends a resource request in the current network; if the network device refuses to accept the resource request sent by the UE in the current network, the network device notifies the UE of another network recommended or specified by the network device for the UE to use so as to properly control resources; if the network device accepts the resource request sent by the UE in the current network, the network device notifies the UE of another network recommended by the network device for the UE to use. In this way, the UE can choose to set up resources in the network recommended by the network device, and switch a service stream to the network recommended by the network device, and therefore user experience is improved.

Embodiment 9

Figure 9:
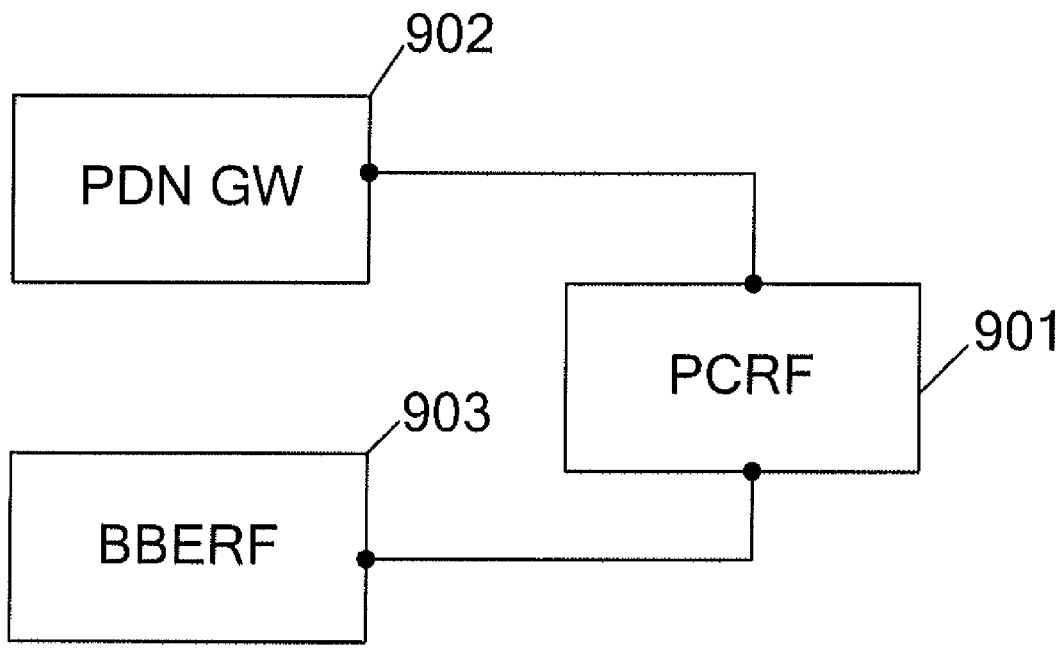
FIG. 9 is a schematic diagram of a network system according to a ninth embodiment of the present invention.

As shown in FIG. 9, a ninth embodiment of the present invention provides a network system. The network system includes:

a PCRF 901, configured to: receive resource information that is requested by a UE and sent by a PDN GW 902; determine another network suitable for the UE to use according to the resource information requested by the UE; and send information about the determined another network to the PDN GW 902; and the PDN GW 902, configured to send the resource information requested by the UE to the PCRF 901, and send information about another network determined by the PCRF to the UE.

Specifically, the PCRF 901 is further configured to generate a PCC rule, and send the PCC rule to the PDN GW 902; and the PDN GW 902 is configured to receive the PCC rule, and set up resources for the UE in the determined network according to the PCC rule.

If a BBERF 903 exists in the determined network, the PCRF 901 is further configured to generate a PCC rule, and send the PCC rule to the BBERF 903; and the BBERF 903 is configured to receive the PCC rule, and set up resources for the UE in the determined network according to the PCC rule.

In the network system provided in the ninth embodiment of the present invention, when the UE accesses multiple networks by using the same APN and sends a resource request in the current network, the PCRF determines another network suitable for the UE to use according to the resource information that is sent by a gateway device and requested by the UE, and send information about the determined another network to the UE through the gateway device. Therefore, the UE can switch a service stream to the network determined by the PCRF, and therefore user experience is improved.

A person skilled in the art may understand that all or part of steps of methods in the foregoing embodiments of the present invention may be implemented by using a program instructing relevant hardware. The program may be stored in a computer readable storage medium such as a Read Only Memory (ROM), a magnetic disk or a Compact Disk-Read Only Memory (CD-ROM).

Disclosed above are a resource control method, a relevant device, and a relevant system provided in the embodiments of the present invention. Although the invention is described by using some exemplary embodiments, the invention is not limited to such embodiments. It is apparent that a person skilled in the art may make modifications and variations to the invention without departing from the spirit and scope of the invention. The invention is intended to cover the modifications and variations provided that they fall within the scope of protection defined by the following claims or equivalents thereof.

What is claimed is:

1. A resource control method, comprising:
receiving from User Equipment (UE) currently associated with a network a resource request message configured for accessing multiple networks using a same Access Point Name (APN)
determining another network suitable for the UE according to resource information specified in said request, and
notifying information about the determined another network to the UE,
said notifying comprises:
determining that a network-side device refuses to accept the resource request message sent by the UE in the current network,
in response to said refusal, sending, by a Policy and Charging Rule Function (PCRF), an identifier (ID) of a network recommended or specified by the PCRF for the UE to use to a gateway device; and
forming a Bearer Resource Request Failure Indication message embedded with the ID of the network recommended or specified by the PCRF for the UE to use,
sending, by the gateway device, the Bearer Resource Request Failure Indication message to the UE
upon detecting that the gateway device is a Packet Data Network (PDN) Gateway (GW),
generating, by the PCRF, a Policy and Charging Control (PCC) rule corresponding to the specified network, and sending the PCC rule to the PDN GW
setting up by the PDN GW resources for the UE in the specified network according to the PCC rule;
forming the Bearer Resource Request Failure Indication message further comprises inserting in said indication message an indication-that the resources have been set up in the specified network,
if a Bearer Binding and Event Reporting Function (BBERF) exists in the specified network, the method further comprises:
generating, by the PCRF, a corresponding PCC rule and sending the PCC rule to the BBERF so that the BBERF sets up resources between the BBERF and the UE in the specified network according to the PCC rule.

2. The method according to claim 1, wherein:
when a network-side device refuses to accept the resource request sent by the UE in the current network, the notifying information about the determined another network to the UE comprises:
sending, by a Packet Data Network (PDN) Gateway (GW), a Bearer Resource Request Failure Indication message to the UE, wherein the Bearer Resource Request Failure Indication message carries an identifier (ID) of a network recommended or specified by the PDN GW for the UE to use.

3. The method according to claim 2, further comprising:
generating, by the PDN GW, a Policy and Charging Control (PCC) rule corresponding to the specified network, and setting up resources for the UE in the specified network according to the PCC rule; wherein
the Bearer Resource Request Failure Indication message further comprises indication information indicating that the resources have been set up in the specified network.

4. The method according to claim 1, wherein:
when a network-side device can accept the resource request sent by the UE in the current network, the notifying information about the determined another network to the UE comprises:
sending, by a Policy and Charging Rule Function (PCRF), an identifier (ID) of a network recommended by the PCRF for the UE to use to a gateway device; and
sending, by the gateway device, a resource setup or modification request in the current network, wherein the resource setup or modification request carries the ID of the network recommended by the PCRF for the UE to use.

5. The method according to claim 4, further comprising:
generating, by the PCRF, a Policy and Charging Control (PCC) rule corresponding to the current network, and sending the PCC rule to the gateway device; wherein
the sending, by the gateway device, the resource setup or modification request in the current network, comprises:
sending, by the gateway device, the resource setup or modification request in the current network according to the PCC rule.

6. The method according to claim 1, wherein:
when a network-side device can accept the resource request sent by the UE in the current network, the notifying information about the determined another network to the UE comprises:

sending, by a Packet Data Network (PDN) Gateway (GW), a resource setup or modification request in the current network, wherein the resource setup or modification request carries an identifier (ID) of a network recommended by the PDN GW for the UE to use.

7. The method according to claim 1, wherein the determining another network suitable for the UE to use according to the resource information requested by the UE comprises:
determining another network suitable for the UE to use according to information about another network and at least one of the following: subscription information of the UE, a Quality of Service (QoS) parameter requested by the UE, and data stream information of the UE.

8. A network device, comprising:
a determining processor configured to:
receive a resource request from a User Equipment (UE) to access multiple networks using a same Access Point Name (APN);
determine another network suitable for the UE based on said resource request message
a sending unit, configured to send a notification message to the UE, wherein the notification message comprises information about the determined another network, wherein:
the network device is a Policy and Charging Rule Function (PCRF); and,
upon detecting that a network-side device refuses to accept the resource request sent by the UE in the current network,
the sending unit is configured to:
form a Bearer Resource Request Failure Indication message embedded with an identifier (ID) of a network recommended or specified by the PCRF for the UE to use,
send the Bearer Resource Request Failure Indication message to a gateway device;
the network device further comprising:
a first processing unit, configured to:
generate a Policy and Charging Control (PCC) rule corresponding to the specified network, and
send the PCC rule to the gateway device so that the gateway device sets up resources for the UE in the specified network according to the PCC rule;
if a Bearer Binding and Event Reporting Function (BBERF) exists in the specified network, the first processing unit is furthered configured to:
generating, by the PCRF, a corresponding PCC rule and sending the PCC rule to the BBERF so that the BBERF sets up resources between the BBERF and the UE in the specified network according to the PCC rule.

9. The network device according to claim 8, wherein: the network device is a Packet Data Network (PDN) Gateway (GW); and, when a network-side device refuses to accept the resource request sent by the UE in the current network,
the sending unit is configured to send a Bearer Resource Request Failure Indication message, wherein the Bearer Resource Request Failure Indication message carries an identifier (ID) of a network recommended or specified by the PDN GW for the UE to use.

10. The network device according to claim 9, further comprising:
a second processing unit, configured to generate a Policy and Charging Control (PCC) rule corresponding to the specified network, and set up resources for the UE in the specified network according to the PCC rule; wherein
the Bearer Resource Request Failure Indication message further comprises indication information indicating that the resources have been set up in the specified network.

11. The network device according to claim 8, wherein: the network device is a Policy and Charging Rule Function (PCRF); and, when a network-side device can accept the resource request sent by the UE in the current network,
the sending unit is configured to send a notification message, wherein the notification message carries an identifier (ID) of a network recommended by the PCRF for the UE to use.

12. The network device according to claim 8, wherein: the network device is a Packet Data Network (PDN) Gateway (GW); and, when a network-side device can accept the resource request sent by the UE in the current network,
the sending unit is configured to send a resource setup or modification request in the current network, wherein the resource setup or modification request carries an identifier (ID) of a network recommended by the PDN GW for the UE to use.

13. A network system, comprising:
a Policy and Charging Rule Function (PCRF), comprising:
a determining processor configured to:
receive a resource request from a User Equipment (UE) via a Packet Data Network (PDN) Gateway (GW) to access multiple networks using a same Access Point Name (APN);
determine another network suitable for the UE based on said resource request message a sending unit, configured to send a notification message to the UE,
wherein the notification message comprises information about the determined another network,
the PCRF is further configured to:
upon detecting that a network-side device refuses to accept the resource request sent by the UE in the current network,
form a Bearer Resource Request Failure Indication message embedded with an identifier (ID) of a network recommended or specified by the PCRF for the UE to use, and
send the Bearer Resource Request Failure Indication message to a gateway device,
generate a Policy and Charging Control (PCC) rule corresponding to the determined network, and
send the PCC rule to the PDN GW; and
the PDN GW sets up resources for the UE in the specified network according to the PCC rule;
if a Bearer Binding and Event Reporting Function (BBERF) exists in the specified network, the first processing unit is furthered configured to:
generating, by the PCRF, a corresponding PCC rule and sending the PCC rule to the BBERF; and
the BBERF is configured to sets up resources between the BBERF and the UE in the specified network according to the PCC rule.

* * * * *